United States Patent
Williams (10) Patent No.: US 9,534,363 B2
(45) Date of Patent: Jan. 3, 2017

(54) PLUMBING DRAIN ASSEMBLY

(71) Applicant: James Williams, Wake Forest, NC (US)

(72) Inventor: James Williams, Wake Forest, NC (US)

(73) Assignee: James Williams, Wake Forest, NC (US)

( * ) Notice: Subject to any disclaimer, the term of this patent is extended or adjusted under 35 U.S.C. 154(b) by 290 days.

(21) Appl. No.: 14/519,916

(22) Filed: Oct. 21, 2014

(65) Prior Publication Data

US 2016/0108608 A1    Apr. 21, 2016

(51) Int. Cl.
| | |
|---|---|
| *E03C 1/122* | (2006.01) |
| *E03C 1/28* | (2006.01) |
| *E03C 1/02* | (2006.01) |
| *F16K 24/06* | (2006.01) |
| *E03C 1/284* | (2006.01) |

(52) U.S. Cl.
CPC ............. *E03C 1/1225* (2013.01); *E03C 1/021* (2013.01); *E03C 1/1222* (2013.01); *E03C 1/28* (2013.01); *E03C 1/284* (2013.01); *F16K 24/06* (2013.01); *Y10T 137/698* (2015.04); *Y10T 137/6969* (2015.04); *Y10T 137/7897* (2015.04)

(58) Field of Classification Search
CPC ........... Y10T 137/698; Y10T 137/6969; Y10T 137/7897; F16K 24/06; D06F 39/081; E03C 1/021; E03C 1/122; E03C 1/1222; E03C 1/1225
USPC ...................................................... 285/132.1
See application file for complete search history.

(56) References Cited

U.S. PATENT DOCUMENTS

| | | | | |
|---|---|---|---|---|
| 1,571,707 | A * | 2/1926 | Casper .................... | E03C 1/284 |
| | | | | 137/247.27 |
| 1,629,208 | A * | 5/1927 | Ernst ....................... | E03C 1/122 |
| | | | | 138/37 |
| 2,216,460 | A * | 10/1940 | Sisk ........................ | E03C 1/122 |
| | | | | 285/132.1 |
| 2,470,308 | A * | 5/1949 | Haddican ............... | F16L 13/007 |
| | | | | 285/132.1 |
| 3,096,782 | A * | 7/1963 | Williams ................. | E03B 9/00 |
| | | | | 137/360 |

(Continued)

OTHER PUBLICATIONS

Tradelink. "Determined Airflow Capacity & Maximun fixture Unit Loading of STUDOR Air Admittance Valves." Retrieved from the internet: URL:http://www.studor.net/documents/0008-0005_092013.pdf [retrieved on Oct. 20, 2014]; pp. 1-2.

(Continued)

*Primary Examiner* — Kevin Murphy
(74) *Attorney, Agent, or Firm* — Carlson, Gaskey & Olds, P.C.

(57) ABSTRACT

According to one aspect of the present disclosure, a plumbing drain assembly is disclosed which includes a plumbing outlet box, a Y connector, and an air intake valve. The plumbing outlet box has a back wall and four sidewalls that extend outward from the back wall to form a cavity. The Y connector includes a first and second drain channels. The first drain channel is mounted in the cavity and has opposing first and second ends. The second drain channel merges with the first drain channel between the first and second ends. The air intake valve is mounted to the first end of the first drain channel, and is configured to allow exterior air to enter into the first drain channel through the first end, and prevent internal air from exiting the first drain channel through the first end.

21 Claims, 12 Drawing Sheets

(56) References Cited

U.S. PATENT DOCUMENTS

| | | | | |
|---|---|---|---|---|
| 3,862,433 | A * | 1/1975 | Rousselet | A01B 39/19 137/360 |
| 4,158,471 | A * | 6/1979 | Logsdon | D06F 39/083 137/360 |
| 4,934,410 | A * | 6/1990 | Humber | D06F 39/08 137/360 |
| 5,971,014 | A * | 10/1999 | Duren | E03C 1/12 137/526 |
| 6,799,600 | B2 * | 10/2004 | O'Neal | E03C 1/12 137/382 |
| 2005/0150037 | A1 * | 7/2005 | Cornwall | E03C 1/122 4/211 |
| 2009/0173396 | A1 * | 7/2009 | Spadavecchia | E03C 1/122 137/357 |

OTHER PUBLICATIONS

Studor Mini-Vent. "Air Admittance Valve for Plumbing Ventilation." Retrieved from the internet: URL:http://www.studor.net/documents/0400-0004-092013%20Mini-Vent.pdf [retrieved Oct. 20, 2014]; Sep. 2013; p. 1.

Water Tite. "Center Drain Washing Machine Outlet Box with Quarter Turn Valves." Retrieved from the internet: http://www.ipscorp.com/pdf/watertite/WT_WMOB_82064-82004.pdf [retrieved on Oct. 20, 2014]; p. 1.

Oatey. "Quadtro Washing Machine Outlet Boxes." Retrieved from the internet: http://www.oatey.com/doc/quadtrowmobsubmittal.pdf [retrieved on Oct. 20, 2014]; pp. 1-2.

Oatey. "Reversible Metal Washing Machine Outlet Boxes." Retrieved from the internet: http://www.oatey.com/doc/Metal_WMOB_Submittal.pdf [retrieved on Oct. 20, 2014]; pp. 1-2.

The Home Depot. "½ in. Washing Machine Outlet Box." Retrieved from the internet: http://www.homedepot.com/p/SharkBite-1-2-in-Washing-Machine-Outlet-Box-24763/204727767#specifications [retrieved on Oct. 20, 2014]; pp. 1-2.

Studor IPS Corporation. "Specification Sheet / Redi-Vent." Retrieved from the internet: http://www.ipscorp.com/pdf/studor/Studor_RediVent_Spec_Oct09.pdf [retrieved on Oct. 20, 2014]; p. 1.

* cited by examiner

PLUMBING DRAIN ASSEMBLY

TECHNICAL FIELD

This application relates to air intake valves, and more particularly relates to a plumbing drain assembly that incorporates an air intake valve to prevent sewer gases from escaping a plumbing drain.

BACKGROUND

To prevent sewer gases from emanating into a building, every plumbing fixture connected to a sanitary drainage system is protected with a water trap seal. This includes sinks, bathtubs, toilets, etc. Because of its curved shape, a water trap retains a small amount of water after the fixture's use. The water in the trap creates a seal that prevents sewer gas from passing from the drain pipes back out through the fixture (e.g., into the occupied space of a building). If water is not maintained in the trap, then the trap will not serve its function and sewer gases will escape. This can happen, for example, if the plumbing fixture is not used for an extended period of time (e.g., a month or longer), causing the water in the trap to evaporate. This can also happen if siphoning occurs in the trap. Siphoning occurs when a pressure differential within a drain causes the water in the trap to exit the trap.

Figure 1:
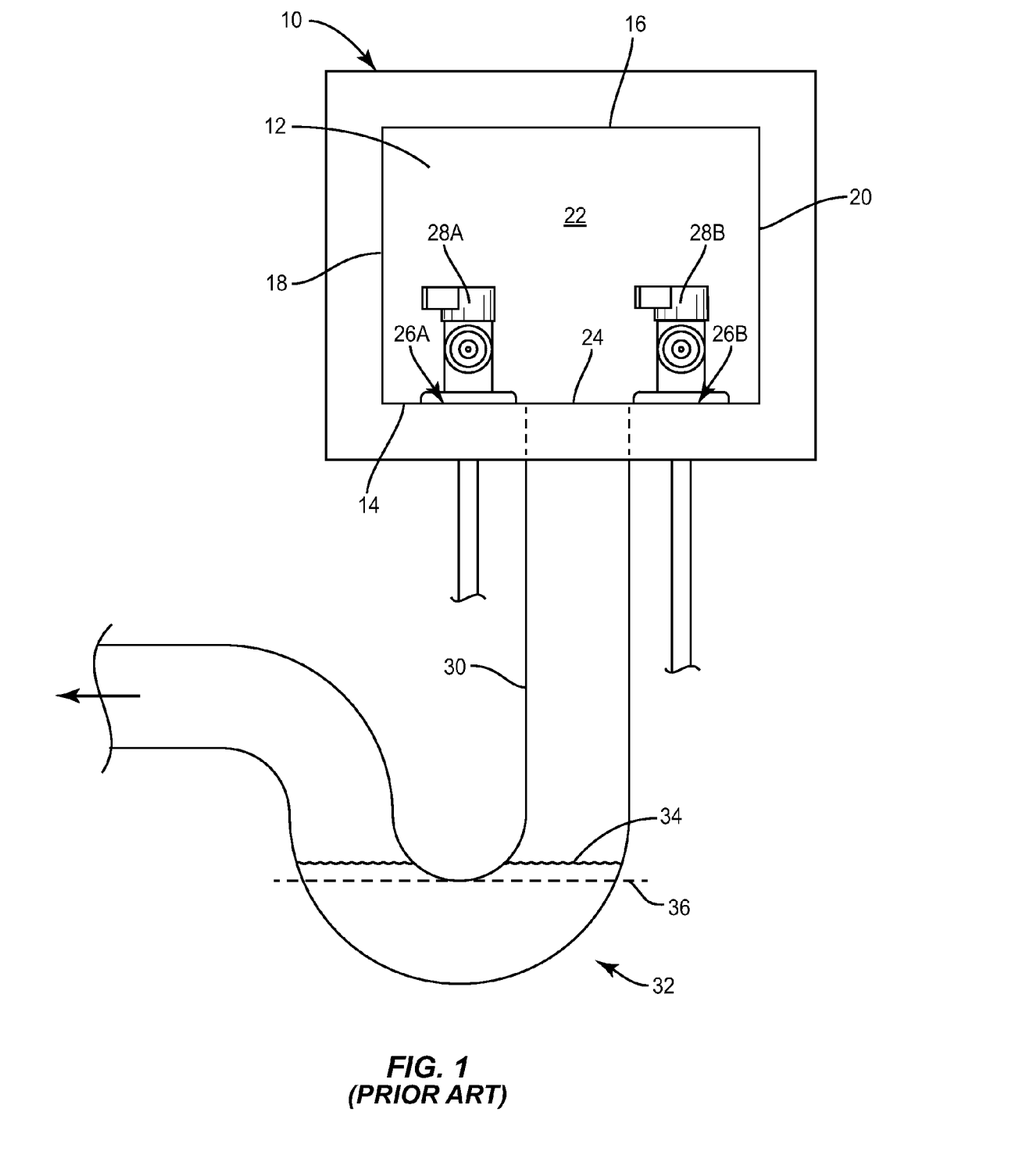
FIG. 1 illustrates a front view of an example plumbing outlet box.
Figure 2:
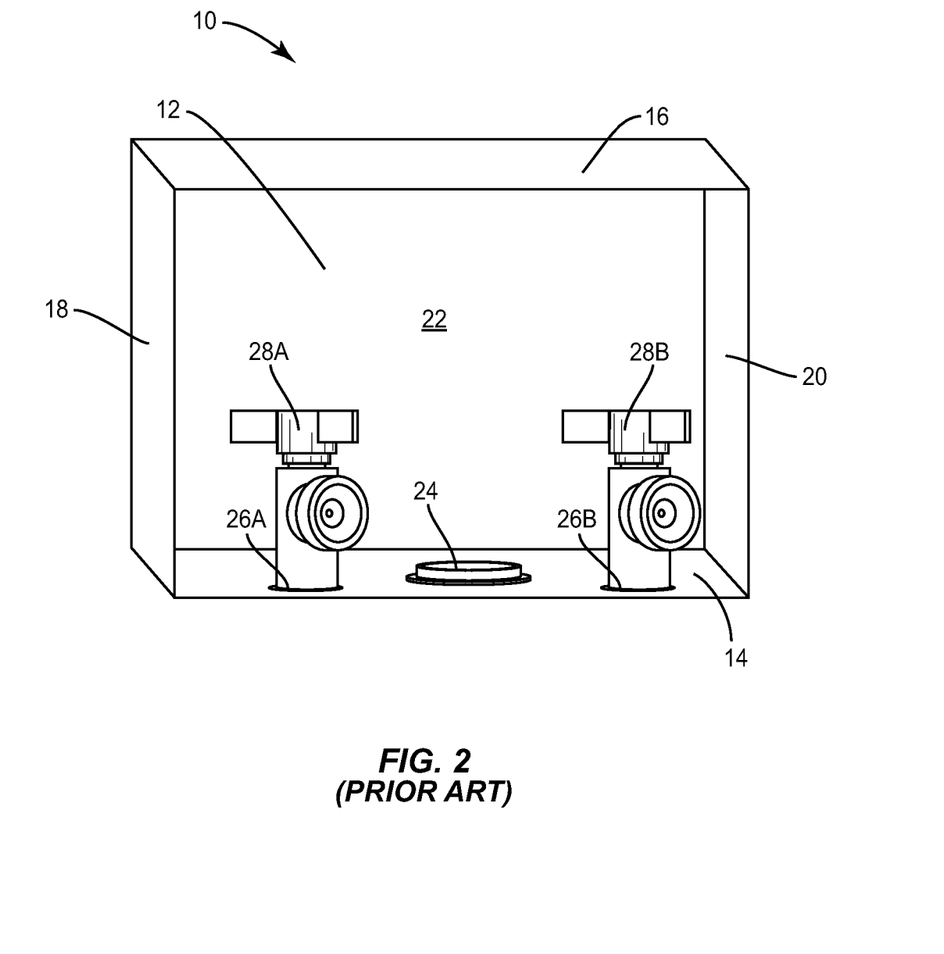
FIG. 2 illustrates a perspective view of the plumbing outlet box.

Many recently built homes include a plumbing outlet box in proximity to an intended location for a washing machine. FIG. 1 illustrates an example plumbing outlet box 10 which includes a back wall 12, and four sidewalls 14-20 that extend outward from the back wall 20 to form a cavity 22 that has an open front. A first one of the sidewalls 14 includes a drain outlet 24 and two liquid inlets 26A, 26B (e.g., one for hot water, and one for cold water). A respective water valve 28A, 28B is secured to each liquid inlet 26. When installed in a building, the cavity 22 is typically recessed into a wall of the building, which enables a washing machine to be placed in close proximity to the wall, and provides convenient access to washing machine plumbing. FIG. 2 illustrates a perspective view of the example plumbing outlet box 10.

The distance between sidewalls 14 and 16 is most commonly 6.25", while the distance between sidewalls 18 and 20 is most commonly 8"-8.25". This is the most common configuration found in most new homes. As a lesser used alternative, some alternate plumbing outlet boxes have a distance between sidewalls 14 and 16 of 6.125"-7.5" and a distance between sidewalls 18 and 20 of 8.75"-9".

A standpipe 30 is mounted to the drain outlet 24, and connects the drain outlet 24 to a downstream trap 32 that has a water trap seal. A washing machine drainage hose is typically inserted through the drain outlet 24 into the standpipe 30 for washing machine drainage. The drainage hose typically fits loosely into the drain outlet, which permits air to flow freely around the drain tube in the standpipe 30. This has been needed, because if the drain tube and water outlet 24 were to be sealed off, water would be unable to drain through the drain outlet. However, due to the velocity and volume of water being discharged from a washing machine into a washing machine drain (e.g., into standpipe 30), a siphoning effect may occur causing the water level 34 to drop below threshold 36 (or for all water to be lost from the trap). If the water level drops 34 drops below threshold 36, the seal of the water trap 32 is lost, which enables foul-smelling and dangerous downstream sewer gases to escape out of the drain outlet 24 around the drainage hose. Many homeowners and tenants have simply learned to live with having sewer odors in their laundry rooms as a result.

SUMMARY

According to one aspect of the present disclosure, a plumbing drain assembly is disclosed which includes a plumbing outlet box, a Y connector, and an air intake valve. The plumbing outlet box includes a back wall and four sidewalls that extend outward from the back wall to form a cavity that has an open front. A first one of the sidewalls includes a drain outlet. The Y connector includes a first drain channel and a second drain channel. The first drain channel is mounted in the cavity and includes a first end, an opposite second end, and a straight centerline that extends between the first and second ends. The second end extends into the drain outlet of the first sidewall of the plumbing outlet box. The second drain channel merges with the first drain channel between the first and second ends. The second drain channel is aligned such that it forms an acute angle with respect to the first end of the first drain channel and forms an obtuse angle with respect to the second end of the first drain channel. The air intake valve is mounted to the first end of the first drain channel, and is configured to allow exterior air to enter into the first drain channel through the first end and prevent internal air from exiting the first drain channel through the first end.

In one or more embodiments, the second end of the first drain channel extends through the first sidewall of the plumbing outlet box. In the same or another embodiment, the centerline is perpendicular to the first sidewall and an opposite second sidewall, and is parallel to lateral third and fourth ones of the sidewalls.

In one or more embodiments, the Y connector comprises a main body that includes the intersection of the first and second drain channels, and a pipe that is coaxial with the first drain channel and extends outward from the main body towards the second end of the first drain channel. The pipe includes an angled end and an opposite mounted end that is mounted to the main body. The angled end of the pipe lies within a plane that is angled relative to the centerline at a non-perpendicular, non-parallel angle. The angle may be about 10 degrees, for example.

In some embodiments, the angled end of the pipe causes the pipe to have a length measured between the mounted and angled ends that is longer on a first side of the pipe than on an opposing second side of the pipe. In some embodiments the longer first side of the pipe and the second drain channel are positioned on the same side of the first drain channel.

According to another aspect of the present disclosure, a plumbing drain assembly for mounting in a plumbing outlet box is disclosed. The plumbing drain assembly includes first and second conduit members. The first conduit member includes first and second drain channels. The first drain channel includes a first end and an opposite second end, and a straight centerline that extends between the first and second ends. The second drain channel merges with the first drain channel between the first and second ends. The second drain channel is aligned such that it forms an acute angle with respect to the first end of the first drain channel and forms an obtuse angle with respect to the second end of the first drain channel. The second conduit member is coaxial with the first drain channel and extends outward from the first conduit member towards the second end of the first drain channel. The second conduit member includes an angled end and an opposite mounted end that is mounted to the first conduit member. The angled end of the second conduit member lies within a plane that is angled relative to the centerline at a non-perpendicular, non-parallel angle.

According to yet another aspect of the present disclosure, a method of mounting a plumbing drain assembly into a plumbing outlet box is disclosed. The plumbing drain assembly includes a Y connector having a first drain channel and an angled second drain channel that merges with the first drain channel between first and second ends of the first drain channel. The plumbing outlet box has a back wall and four sidewalls that extend outward from the back wall to form a cavity having an open front. According to the method, the Y connector is positioned in relation to the plumbing outlet box such that the second end of a first drain channel is situated within the cavity, and the first end of the first drain channel is angled outward to extend outside the cavity through the open front. The second end of the first drain channel is inserted into a drain outlet in a first one of the sidewalls of the plumbing outlet box while the first end of the first drain channel is still angled to extend outside the cavity through the open front. The Y connector is pivoted upwards into the cavity of the plumbing outlet box, such that the first drain channel extends between the first sidewall and a second one of the sidewalls that is opposite the first sidewall, and is perpendicular to the first and second sidewalls.

In some embodiments, an air intake valve is mounted to the first end of the first drain channel, with the mounting occurring before the positioning, inserting, and pivoting, to allow exterior air to enter into the first drain channel through the first end, and prevent internal air from exiting the first drain channel through the first end.

The second drain channel has a first end and an opposite second end that merges with the first drain channel between first and second ends of the first drain channel. In some embodiments, the method includes positioning the Y connector within the cavity, with the first end of the second drain channel facing outward for receiving a drain tube. In some such embodiments, the method also includes mounting a collar to the first end of the second drain channel by rotating the collar, which is threaded for attachment to the first end of the second drain channel; and compressing, via the rotating, a ring between the collar and the first end of the second drain channel.

Of course, the present disclosure is not limited to the above features and advantages. Indeed, those skilled in the art will recognize additional features and advantages upon reading the following detailed description, and upon viewing the accompanying drawings.

DETAILED DESCRIPTION

The present disclosure describes a plumbing drain assembly that secures an air admittance valve to a drain channel leading to a drain outlet of a plumbing outlet box. A drain tube may be connected to the drain channel (e.g., from a washing machine). When negative pressure is present within the drain channel, the air admittance valve opens to allow air into the drain channel, but once the negative pressure is removed the air admittance valve automatically closes. This permits exterior air to enter the drain channel through the air admittance valve when pressure within the drain channel drops below atmospheric pressure, thus prevents a downstream fixture trap seal from being siphoned. This also prevents interior air within the drain channel (e.g., foul sewer gases) from escaping through the air admittance valve, because only a one-way flow of air is permitted. By using the air admittance valve as discussed above and also maintaining a tight seal around a drain tube that drains into the drain channel, this configuration keeps sewer gases and fumes contained, and prevents the gases and fumes them from entering a dwelling (e.g., by exiting around the tube or through the air admittance valve). The plumbing drain assembly includes a Y connector 42 that fits all standard washing machine outlet boxes and can be used for new construction or retrofitting existing boxes.

Figure 3:
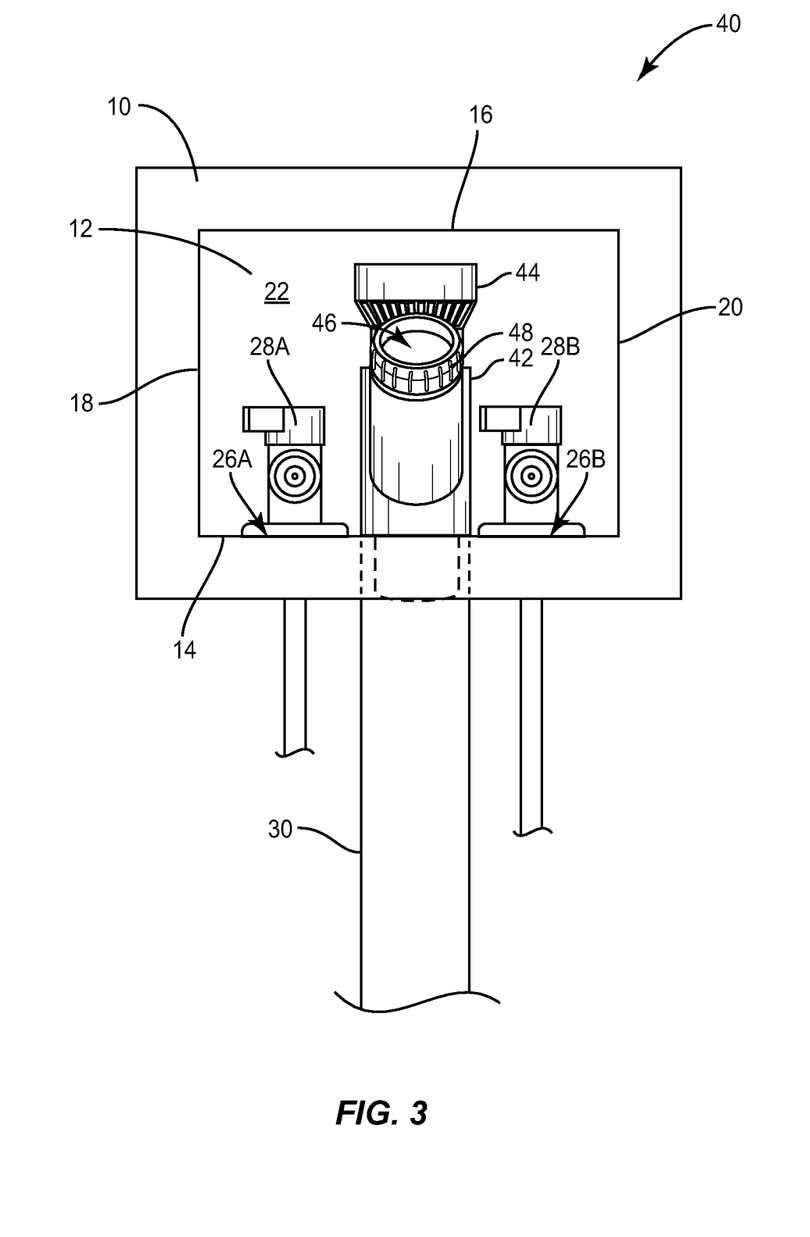
FIG. 3 illustrates a front view of a plumbing drain assembly that includes a plumbing outlet box, Y connector, and air admittance valve.
Figure 4:
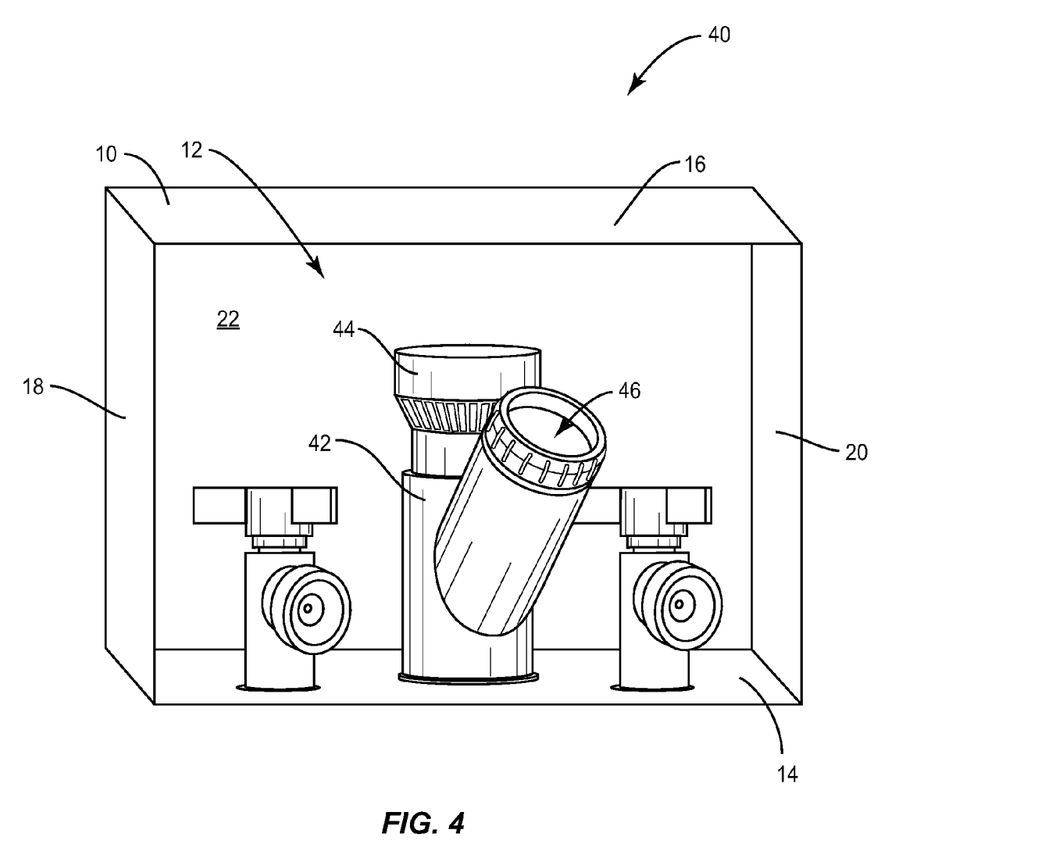
FIG. 4 illustrates a perspective view of the Y connector and air admittance valve within a plumbing outlet box.

FIG. 3 illustrates a front view of a plumbing drain assembly 40 that includes a plumbing outlet box 10, Y connector 42, and air admittance valve 44. For convenience, similar reference numerals are used throughout the figures to indicate similar elements. The assembly 40 includes an opening 46 into a drain channel of the Y connector. The opening 46 is sized to receive a drain tube (e.g., from a washing machine). The opening passes through a collar 48 that can be rotated to form a tight seal (e.g., a compression fit) between the drain tube and the drain channel, and in doing so prevent sewer gas from escaping out of the opening 46 around the drain tube. A perspective view of the Y connector 42 and air admittance valve 44 within plumbing outlet box 10 is shown in FIG. 4. In some embodiments, the drain tube could be used to drain water from a washing machine into the opening 46, and the liquid inlets 26A-B could be used to provide water to the washing machine.

Figure 5:
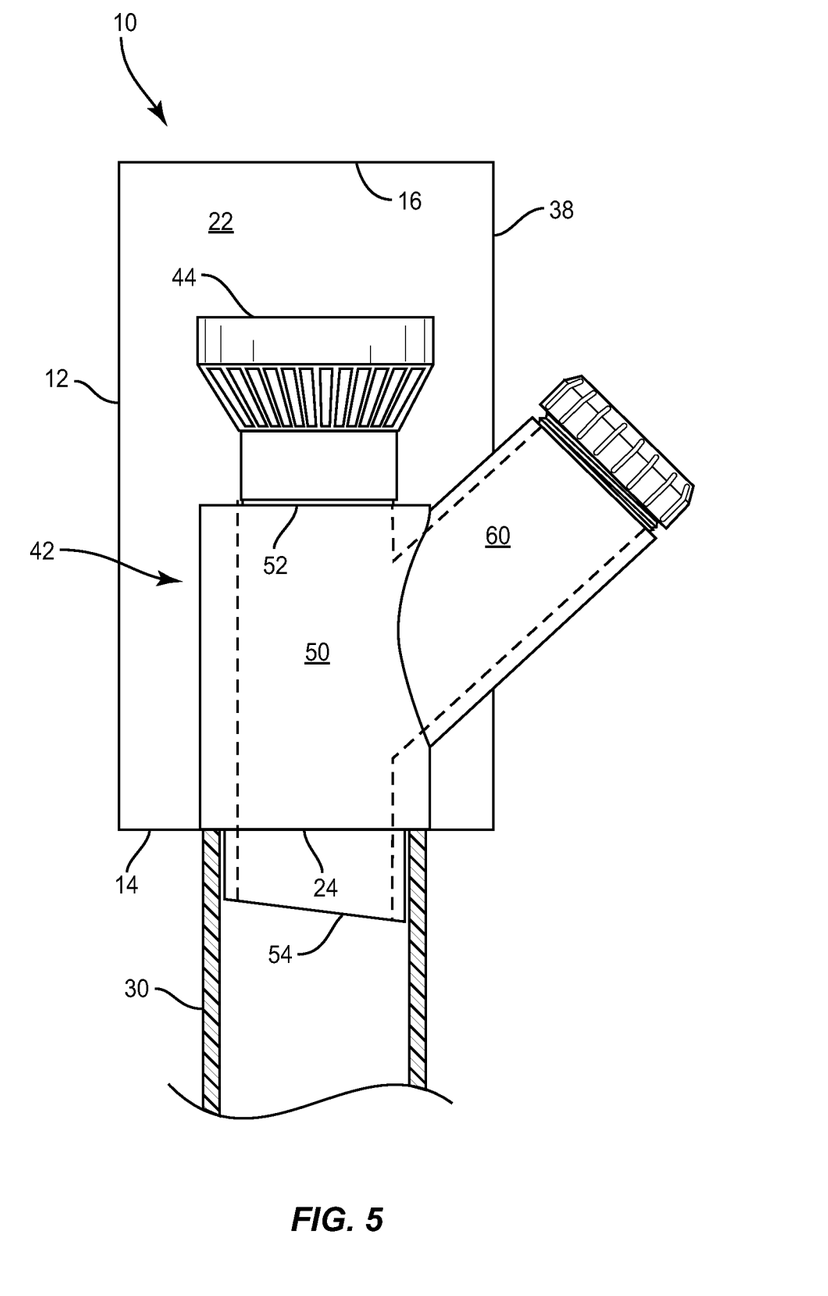
FIG. 5 illustrates a side view of the Y connector and air admittance valve within a plumbing outlet box.

FIG. 5 illustrates a side view of the Y connector 42 and air admittance valve 44. The Y connector 42 is at least partially situated within cavity 22 of the plumbing outlet box 10. As shown in FIG. 5, the Y connector 42 includes a first drain channel 50 and a second drain channel 60 that merges with the first drain channel. The first drain channel 50 includes a first end 52 and an opposite second end 54, and a straight centerline 56 (see FIG. 6) that extends between the first and second ends 52, 54. The second end 54 of the first drain channel 50 extends into the drain outlet 24 of the first sidewall 14. The Y connector 42 is mounted such that the first drain channel 50 is situated within the cavity 22 of the plumbing outlet box 10.

Air intake valve 44 is mounted to the first end 52 of the first drain channel 50. The air intake valve 44 is configured to allow exterior air to enter into the first drain channel 50 through the first end 52, and to prevent internal air from exiting the first drain channel 50 through the first end 52. This prevents siphoning of a downstream fixture trap and also prevents sewer gases from escaping through the first end 52.

The second drain channel 60 of the Y connector merges with the first drain channel 50 between the first and second ends 52, 54. In the embodiment of FIG. 4, the second drain channel 60 extends through open face 38 of the plumbing outlet box 10 to reside partially outside of the cavity 22 of the plumbing outlet box 10.

Figure 6:
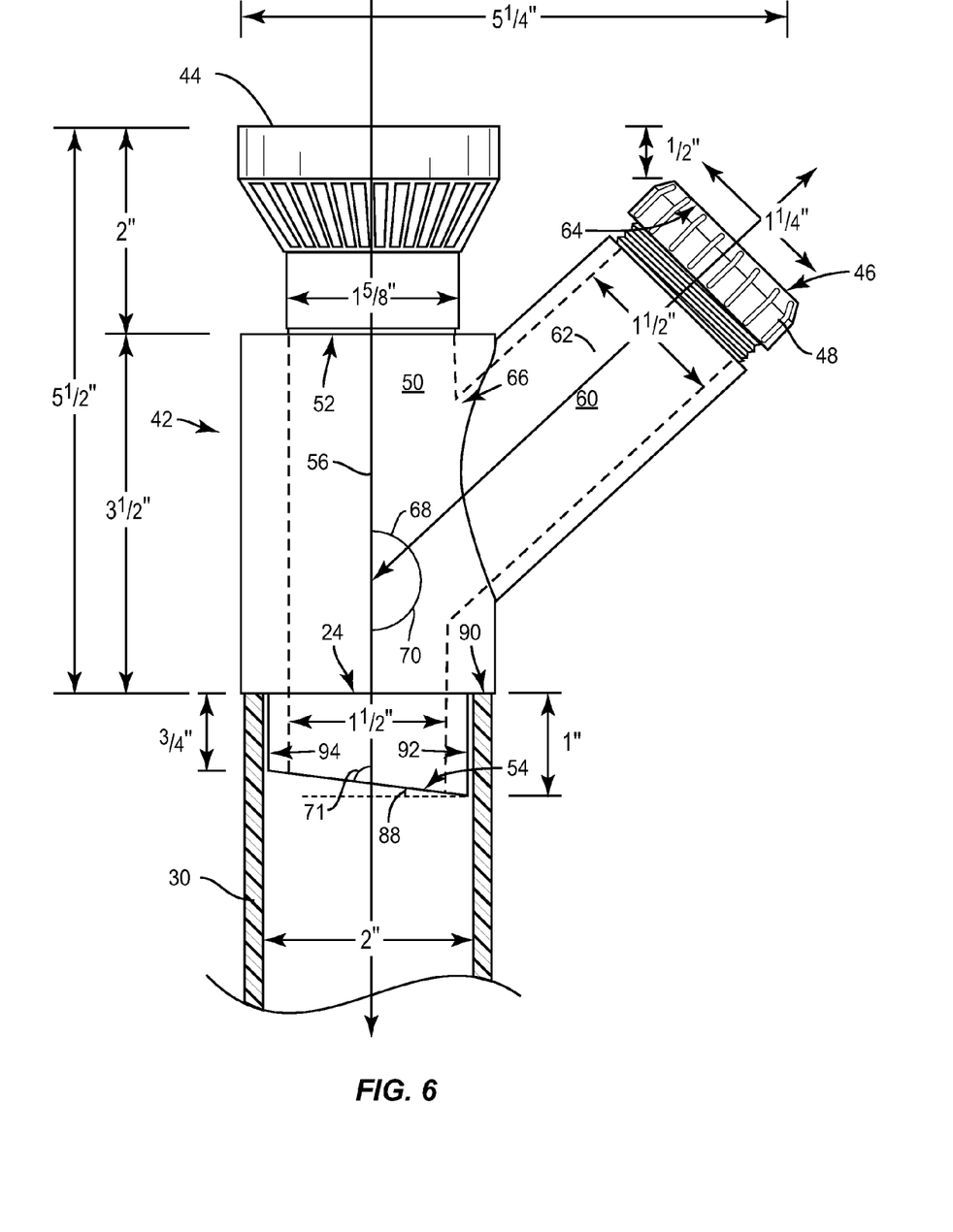
FIG. 6 illustrates a side view of the Y connector and air admittance valve with additional details, and some example, non-limiting dimensions.

FIG. 6 illustrates a side view of the Y connector 42 and air admittance valve 44 with additional details, and some example, non-limiting dimensions. FIG. 6 illustrates the centerline 56 of the first drain channel. In some embodiments, when the Y connector 42 is mounted in the plumbing outlet box 10 as shown in FIG. 4, the centerline 56 is perpendicular to sidewalls 14, 16 of the plumbing outlet box 10. In such embodiments, the centerline 56 is parallel to lateral sidewalls 18, 20 of the plumbing outlet box 10.

FIG. 6 also illustrates a centerline 62 of the second drain channel 60, which extends between a first end 64 and an opposite second end 66. The merging of the second drain channel 60 with the first drain channel 50 occurs between the first and second ends 52, 54 of the first drain channel 50. It is the second end 66 of the second drain channel 60 that merges with the first drain channel. The second drain channel 60 is aligned with respect to the first drain channel 50 such that its centerline 62 forms an acute angle 68 with respect to the first end 52 of the first drain channel 50, and forms an obtuse angle 70 with respect to the second end 54 of the first drain channel 50.

In the embodiment of FIG. 6, the second end 54 of the first drain channel has a greater exterior diameter measured perpendicular to the centerline 56 (1.5") than an exterior diameter of the pipe 82 measured perpendicular to the centerline 56 (2"). This difference in diameter forms a ledge 90 that abuts standpipe 30. The term "inner diameter" refers to a distance between the opposing interior walls on opposing sides of the first drain channel 50, while "exterior diameter" refers to a distance between opposing exterior walls on opposing sides of the first drain channel 50.

Figure 7:
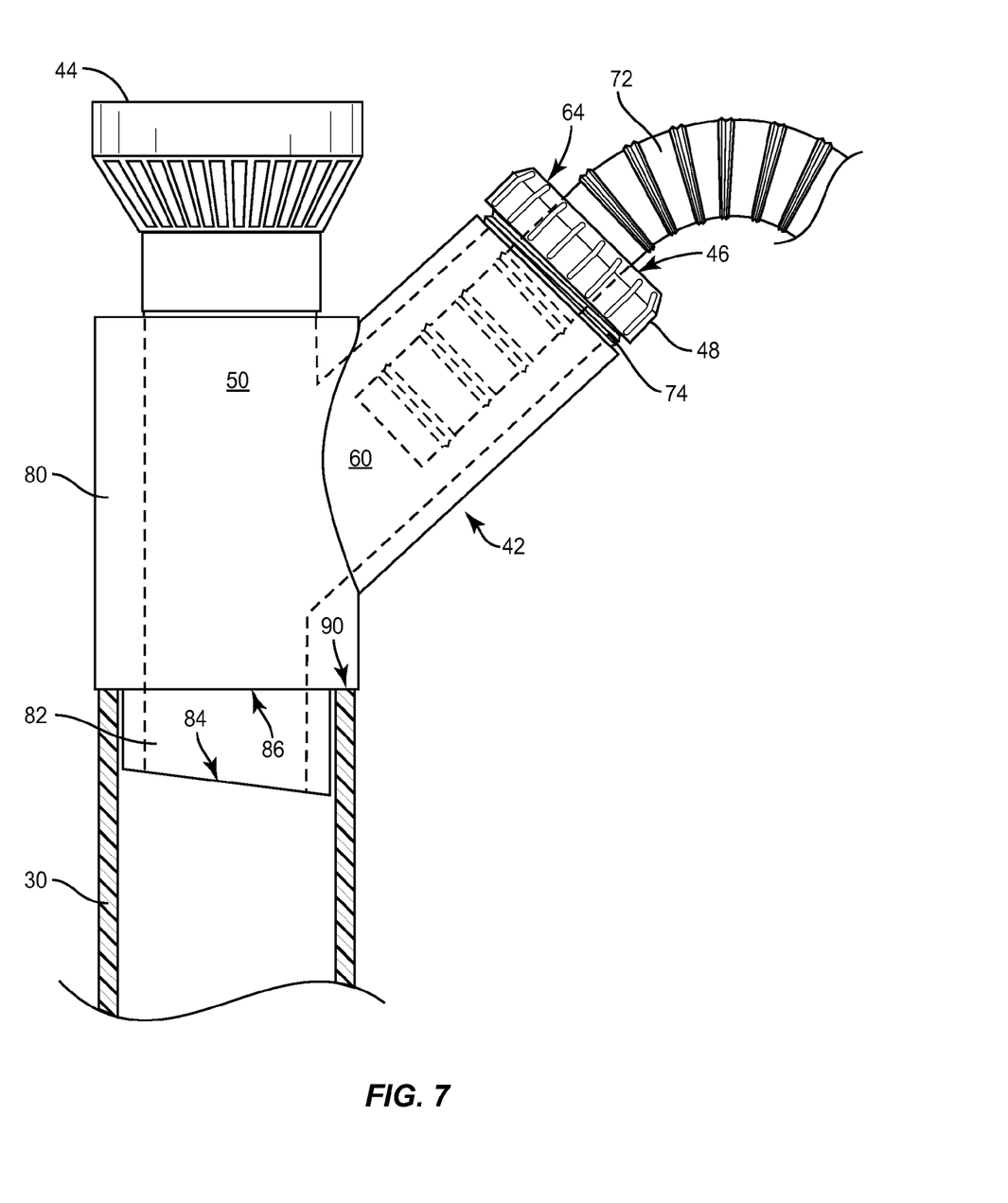
FIG. 7 illustrates a side view of the Y connector and air admittance valve, with a drain tube inserted into the Y connector.

FIG. 7 illustrates a side view of the Y connector 42 and air admittance valve 44, with a drain tube 72 inserted into the Y connector 42. In particular, the drain tube 72 is inserted into the opening 46 at the first end 64 of the second drain channel 60. The first end 64 of the second drain channel 60 is externally threaded (see threads 74). An internally threaded collar 48 can be rotated to mount to the threads 74 at the first end 64 of the second drain channel 60. Through the rotating, a tight seal (e.g., a compression fitting) can be formed at the first end 64 of the second drain channel 60 around the drain tube 72. As shown in FIG. 7, the Y connector 42 can serve as a laundry stand pipe adapter between drain tube 72 and laundry standpipe. The drain tube 72 may provide drainage from a washing machine, for example.

As shown in FIG. 7, the Y connector 42 includes a main body 80 that includes the intersection of the first drain channel 50 and second drain channels 60. The Y connector 42 also includes a pipe 82 that is coaxial with the first drain channel 50, and that extends outward from the main body 80 towards the second end 54 of the first drain channel 50. The pipe 82 includes an angled end 84 and an opposite mounted end 86 that is mounted to the main body 80. The angled end 84 of the pipe 82 lies within a plane that is angled relative to the centerline at a non-perpendicular, non-parallel angle 71. An angle 88 between the plane and another plane that is perpendicular to the centerline is about 10 degrees. In some embodiments, the pipe 82 is secured to the main body 80 using polyvinyl chloride (PVC) glue.

In some embodiments, the air intake valve 44 is externally threaded, and the first end 52 of the first drain channel 50 is internally threaded for mounting the air intake valve 44 to the first end 52 of the Y connector 42. Some example air intake valves that could be used include the "Mini-Vent", "Maxi-Vent", and "Redi-Vent" valves from STUDOR. Of course, it is understood that these are only examples, and that other air admittance valves and mounting arrangements could be used.

Referring again to FIG. 6, the angled end 54 of the pipe 82 causes the pipe 82 to have a length measured between the mounted and angled ends (1" in FIG. 6) that is longer on a first side 92 of the pipe 82 than on an opposing second side 94 of the pipe (0.75" in FIG. 6). In the example of FIG. 6, the first side 92 of the pipe 82 and the second drain channel 60 are positioned on the same side of the first drain channel 50.

In some embodiments a ratio between the following is within the range of 0.65-0.8:
- a distance measured between a longest side of the pipe 82 (side 92 in FIG. 6) at the angled end 84 of the pipe 82 and the first end 52 of the first drain channel 50, the distance being measured parallel to the centerline 56 (this distance is 4.5" in the example of FIG. 6); and
- a distance between the first and second sidewalls 14, 16 (in most plumbing outlet boxes 10 this is 8"-8.25", and is less commonly 8.75"-9").

In some embodiments, a ratio between the following is within the range of 0.8-0.9:
- a distance measured between the first end 52 of the first drain channel 50 and the angled 84 end of the pipe 82 at the longest side of the pipe 82 (side 92 in FIG. 6) (this distance is 4.5" in the example of FIG. 6); and
- a distance measured between the first end 52 of the first drain channel 50 and the angled end 84 of the pipe 82 at the shortest side of the pipe (side 94 in FIG. 6) (this distance is 4.25" in the example of FIG. 6);

In these embodiments, each distance is measured parallel to the centerline 56.

Figure 8:
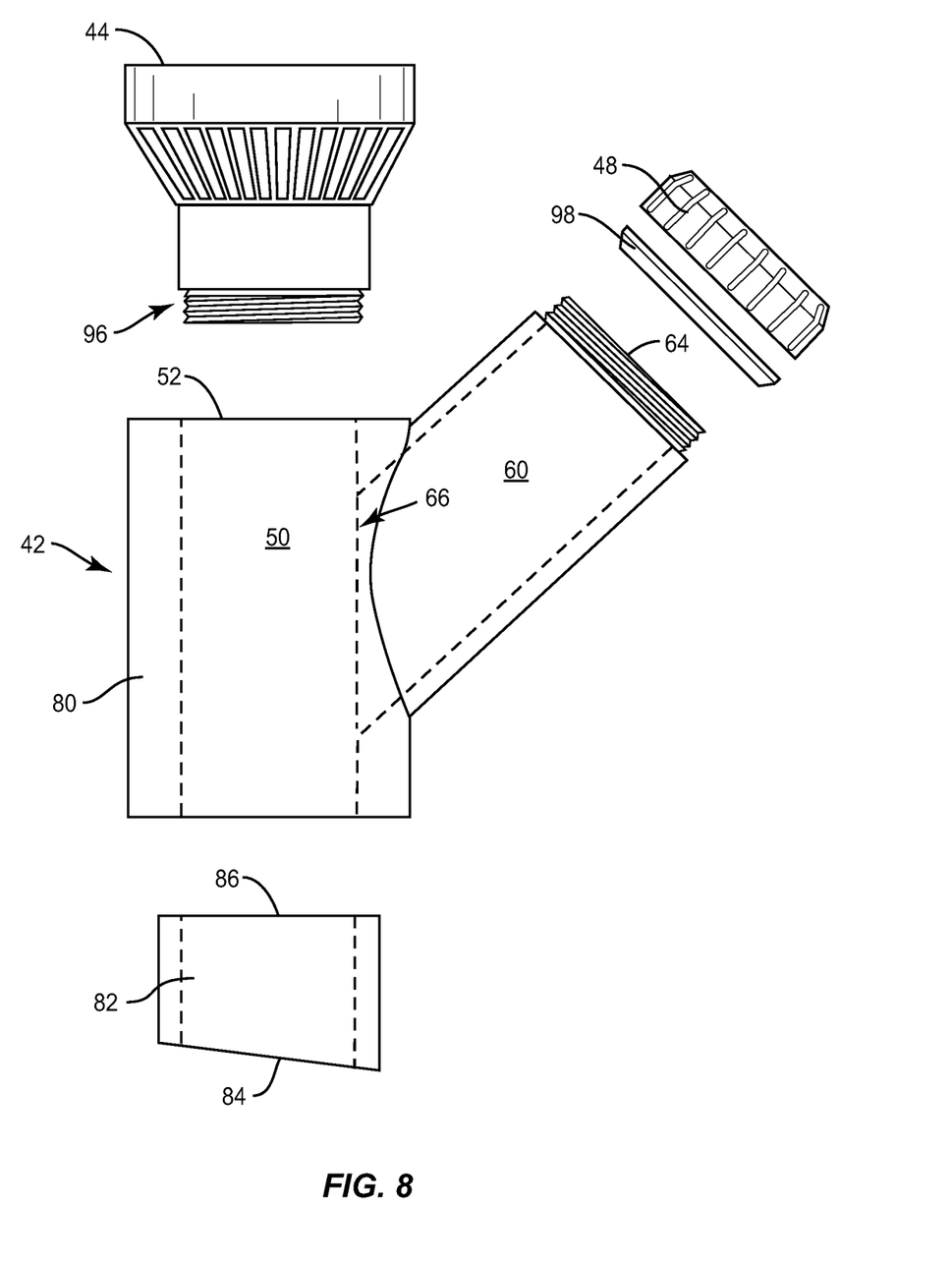
FIG. 8 illustrates an exploded view of the Y connector and air admittance valve.

FIG. 8 illustrates an exploded view of the Y connector 42 and air admittance valve 44. As shown in FIG. 8, in some embodiments the air intake valve 44 is externally threaded (see threads 96), and the first end 52 of the first drain channel 50 is internally threaded for mounting the air intake valve 4 to the first end of the Y connector 42. The collar 48 is configured to mount to the first end 64 of the second drain channel 60 by rotating its internal threading with respect to the external threading of the first end 64 of the second drain channel 60. A ring 98 is situated between the collar 48 and the first end 64 of the second drain channel 60. The collar 48 is configured to compress the ring 98 between itself and the first end 64 of the second drain channel 60 through the rotating. This compressing can form a tight seal around the drain tube 72 inserted into the second drain channel 60, to prevent sewer gas from escaping through the opening 64 around the drain tube 72. In some embodiments, the ring 98 is a compression ring (as shown in FIG. 8) such that the fitting around the drain tube 72 is a "compression fitting."

However, it is understood that other rings could be used, such as a washer, to form a tight seal around the drain tube 72.

Figure 9:
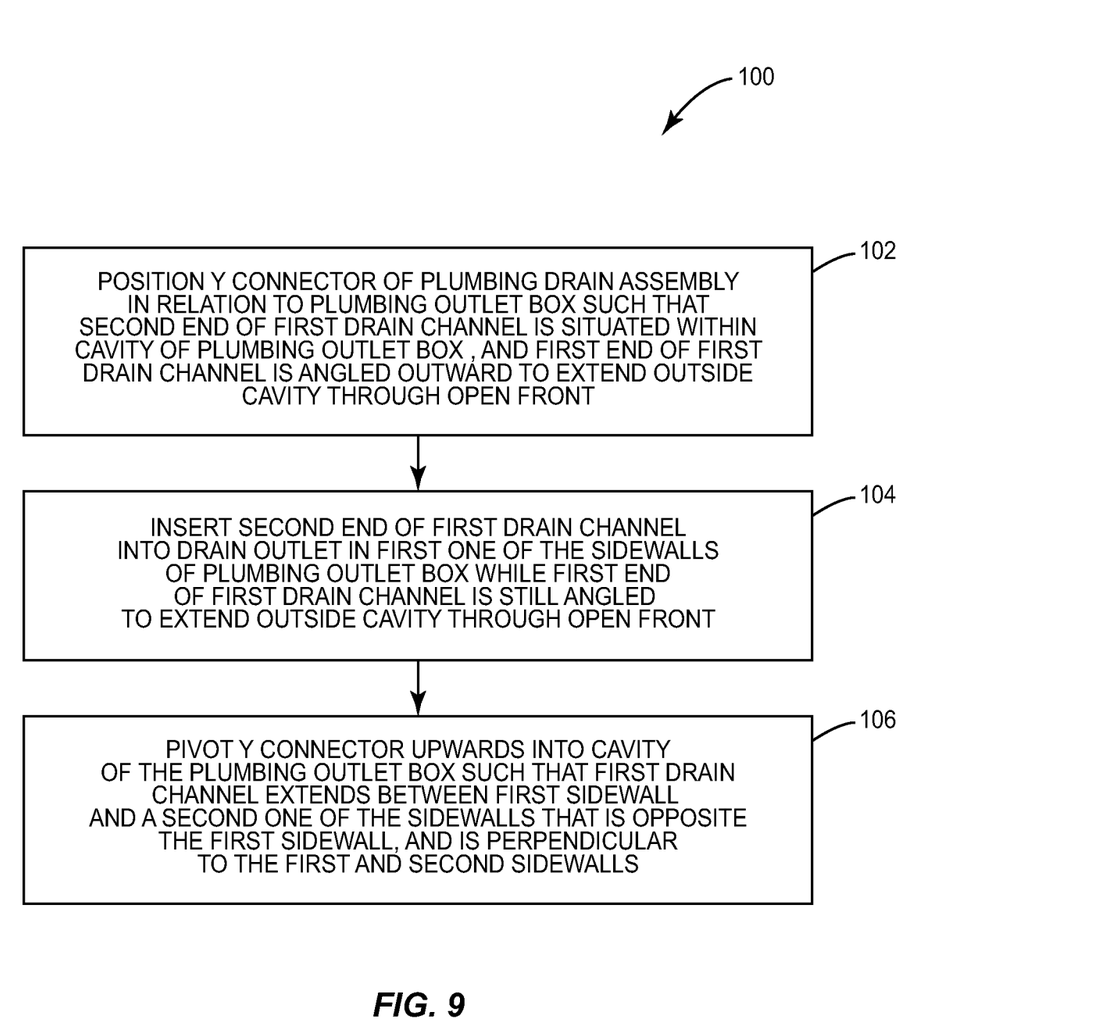
FIG. 9 schematically illustrates a method of mounting a plumbing drain assembly into a plumbing outlet box.
Figure 10:
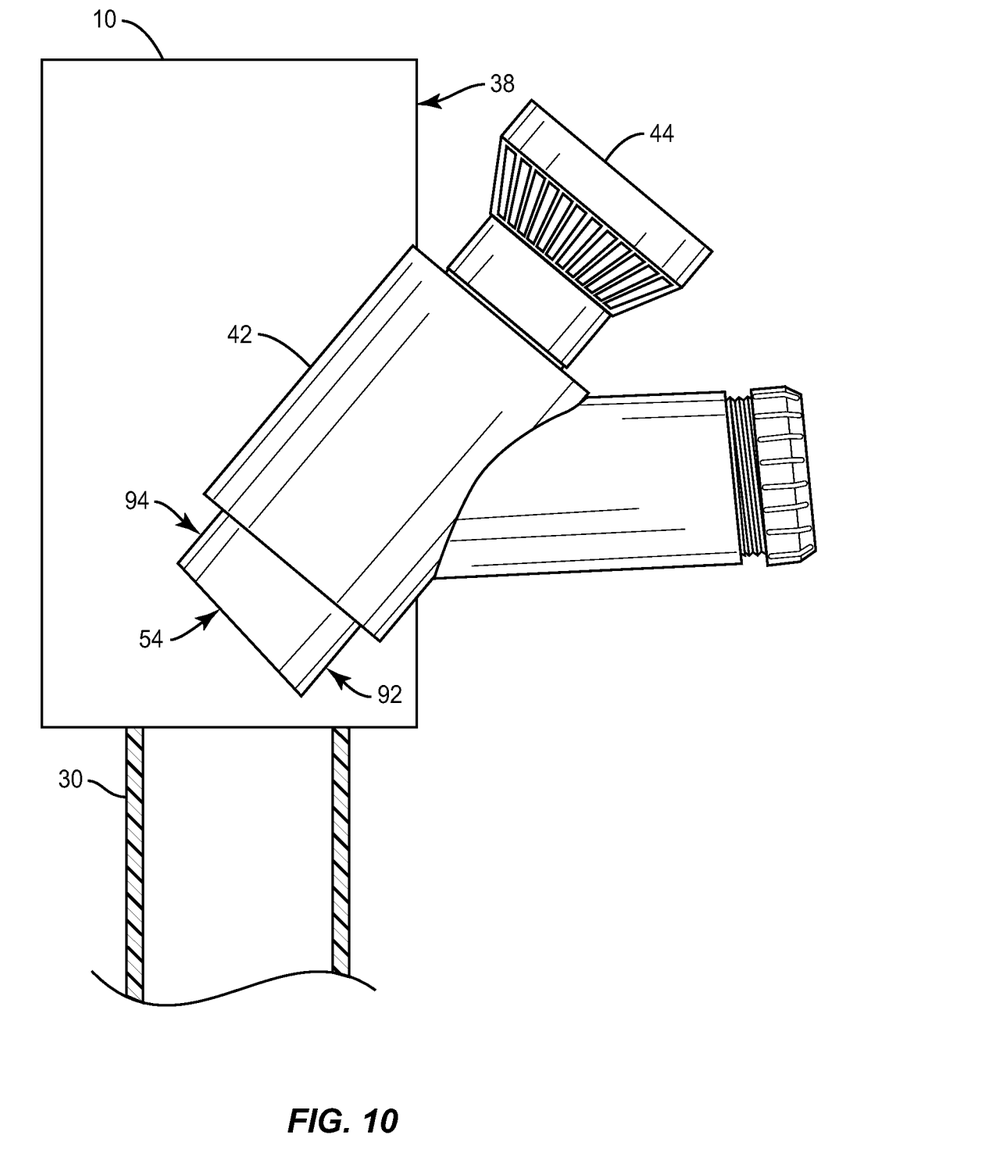
FIG. 10 illustrates an aspect of the method of FIG. 9.

FIG. 9 schematically illustrates a method 100 of mounting a plumbing drain assembly into a plumbing outlet box. The Y connector 42 is positioned (block 102) in relation to the plumbing outlet box 10 such that the second end 54 of a first drain channel 50 is situated within the cavity 22, and the first end 52 of the first drain channel 50 is angled outward to extend outside the cavity 22 through the open front 38. An example of the positioning of block 102 is depicted in FIG. 10.

The second end 54 of the first drain channel 50 inserted (block 104) into the drain outlet 24 in the first sidewall 14 of the plumbing outlet box 10 while the first end 52 of the first drain channel 50 is still angled to extend outside the cavity 22 through the open front 38. An example of the inserting of block 104 is depicted in FIG. 11.

The Y connector is pivoted (block 106) upwards into the cavity 22 of the plumbing outlet box 10 such that the first drain channel 50 extends between the first sidewall 14 and its opposite second sidewall 16, and such that the first drain channel 50 is perpendicular to the first and second sidewalls 14, 16. An example of the pivoting of block 106 is depicted in FIG. 12.

Air intake valve 44 is mounted to the first end 52 of the first drain channel 50. This mounting occurs before the positioning, inserting, and pivoting of blocks 102-106, thereby allowing exterior air to enter into the first drain channel 50 through the first end 52, and preventing internal air from exiting the first drain channel 50 through the first end 52.

Figure 11:
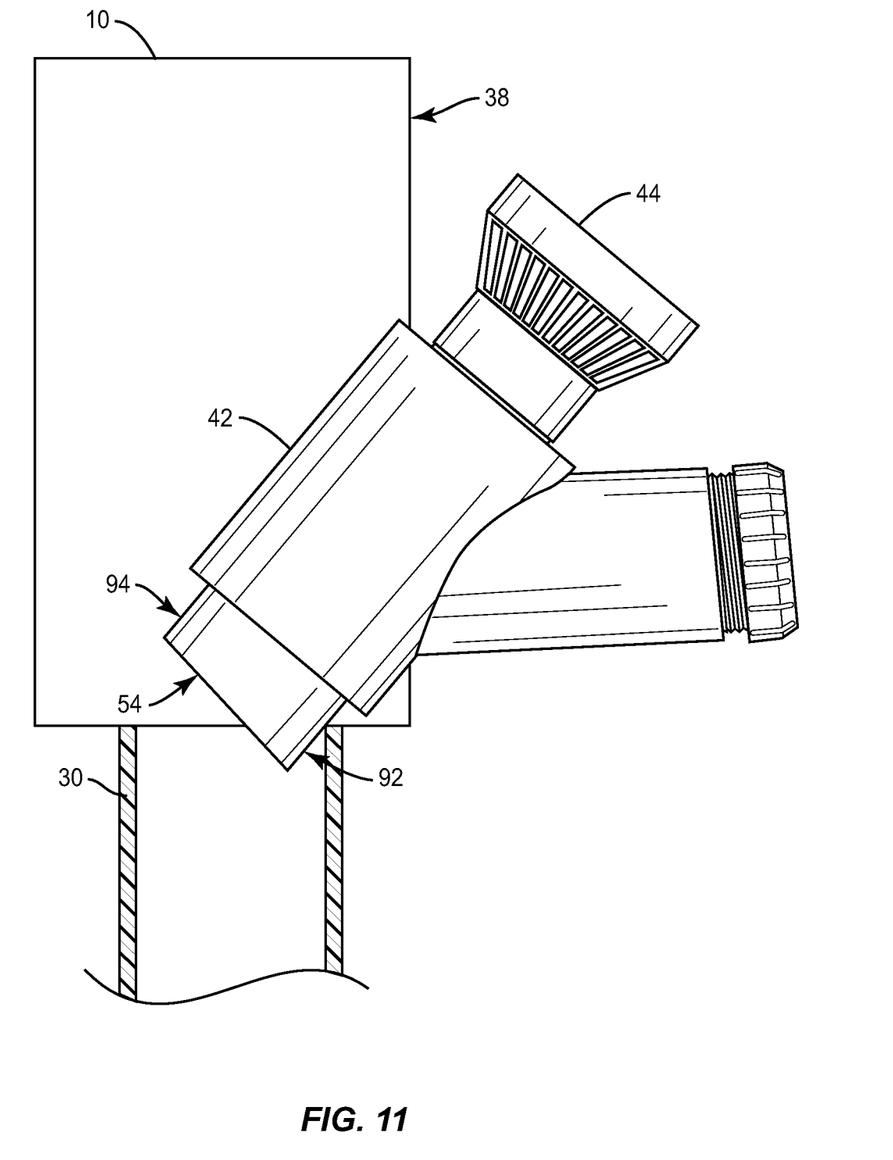
FIG. 11 illustrates another aspect of the method of FIG. 9.
Figure 12:
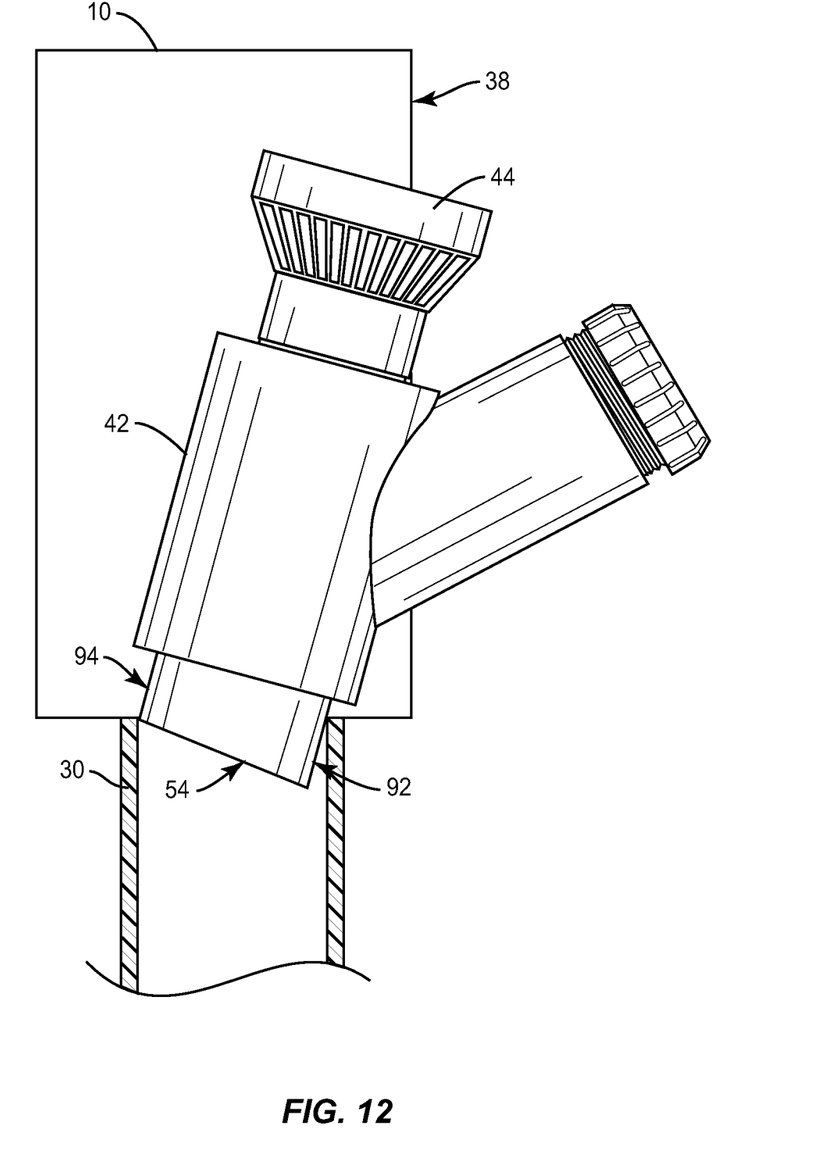
FIG. 12 illustrates another aspect of the method of FIG. 9.

In the embodiments of FIGS. 10-12, the fact that the second end 54 of the first drain channel is angled facilitates the positioning, inserting, and pivoting of blocks 102-106. For example, by facing the first side 92 of the pipe 82 towards the open face 38 of the plumbing outlet box 10 during the inserting and pivoting of blocks 104, 106, the pivoting and inserting can be achieved in the cavity of plumbing outlet box 10 within the limited clearance provided between sidewalls 14, 16, whereas without such angling it may be difficult or impossible to insert the pipe 82 of Y connector 42 into the drain outlet 24 within the cavity 22.

As discussed above, in the most commonly used plumbing outlet boxes, the distance between sidewalls 14 and 16 is 6.25" and the distance between sidewalls 18 and 20 is 8"-8.25". As a lesser used alternative though, some alternate plumbing outlet boxes have a distance between sidewalls 14 and 16 of 6.125"-7.5" and a distance between sidewalls 18 and 20 of 8.75"-9". A Y connector 42 that uses the same dimensions of FIG. 6 or dimensions that are about the same will fit into any of these boxes for the positioning, inserting, and pivoting of blocks 102-106 (as depicted in FIGS. 10-12).

In some embodiments, after the mounting, positioning (block 102), inserting (block 104), pivoting (block 106), the second drain channel 60 of the Y connector 42 that merges with the first drain channel 50 between the first and second ends 52, 54 of the first drain channel 50 extends outside the cavity 22 through the open front 38 of the plumbing outlet box 10 (e.g., as shown in FIG. 5). In such embodiments, the second drain channel 60 is exposed (e.g., through opening 46) to provide access to the first drain channel 50. The exposed opening 46 can be used for inserting a washing machine drain tube 72 as discussed above.

In some embodiments of the method 100, the second drain channel 60 has a first end 64 and an opposite second end 66 that merges with the first drain channel 50 between first and second ends 52, 54 of the first drain channel 50. In such embodiments, the method 100 also includes positioning the Y connector 42 within the cavity 22, with the first end 64 of the second drain channel 60 facing outward for receiving a drain tube (e.g., drain tube 72).

As discussed above, collar 48 is threaded. The method 100 may also include rotating the collar 48 to mount to the first end 64 of the second drain channel 60. Through the rotating, a ring 98 can be compressed between the collar 48 and the first end 64 of the second drain channel 60 to form a tight seal (e.g., a compression fit) around drain tube 72 (which prevents sewer gases from exiting through the second drain channel 60 around the drain tube 72).

As discussed in connection with FIG. 6, a ledge 90 is formed by a junction of a mounted end 86 of the pipe 82 and the main body 80 at which junction the main body 80 has a greater exterior diameter than the pipe 82. In some embodiments, the method 100 also includes, after the pivoting of block 106, abutting the ledge 90 of the Y connector 42 against the first sidewall 14 of the plumbing outlet box 10. In such embodiments, the inserting of block 104 comprises inserting the angled end 88 of the pipe 82 into the drain outlet 24.

Referring again to FIG. 8, an exploded view of the Y connector 42 and air admittance valve 44 is shown. In this regard, the main body 80 of the Y connector could be considered a "first conduit member" that includes the first drain channel 50 and second drain channel 60, and the pipe 82 could be considered a "second conduit member."

In this regard, the first drain channel 50 of the "first conduit member" would include a first end 52 and an opposite second end 54, and a straight centerline 56 that extends between the first and second ends 52, 54. The second drain channel 60 merges with the first drain channel 50 between the first and second ends 52, 54. Also, the second drain channel 60 is aligned such that it forms an acute angle 68 with respect to the first end 52 of the first drain channel 50 and forms an obtuse angle 70 with respect to the second end 54 of the first drain channel 50.

The pipe 82 could be considered a "second conduit member" that is coaxial with the first drain channel 50 and extends outward from the "first conduit member" towards the second end 54 of the first drain channel 50. In this regard, the "second conduit member" would include an angled end 84 and an opposite mounted end 86 that is mounted to the first conduit member, with the angled end 84 of the second conduit member lying within a plane that is angled relative to the centerline 56 at a non-perpendicular, non-parallel angle. The angle between the plane and another plane that is perpendicular to the centerline could be about 10 degrees (see angle 88 in FIG. 6).

In the embodiments shown above, the liquid inlets 26A-B of the plumbing outlet box 10 are situated on opposite sides of the Y connector 42. Also, the drain outlet 24, and liquid inlets 26A are each situated on the first sidewall 14 of the plumbing outlet box 10. However, it is understood that these are non-limiting examples, and that the liquid inlets 26 could alternatively be located on the same side of the Y connector 42, or could be situated on opposing sidewall 16 of the plumbing outlet box 10.

The present disclosure may, of course, be carried out in other ways than those specifically set forth herein without departing from essential characteristics of the present disclosure. For example, the air intake valve 44 could be mounted to the first end 52 of the first drain channel 50 after the positioning, inserting, and pivoting of blocks 102-106 instead of before the positioning, inserting, and pivoting as described above. Thus, the present embodiments are to be considered in all respects as illustrative and not restrictive, and all changes coming within the meaning and equivalency range of the appended claims are intended to be embraced therein.

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A plumbing drain assembly comprising:
    a plumbing outlet box comprising:
        a back wall and four sidewalls that extend outward from the back wall to form a cavity that has an open front;
        wherein a first one of the sidewalls includes a drain outlet;
    a Y connector comprising:
        a first drain channel mounted in the cavity that includes a first end and an opposite second end, and a straight centerline that extends between the first and second ends, with the second end extending into the drain outlet of the first sidewall; and
        a second drain channel merging with the first drain channel between the first and second ends, wherein the second drain channel is aligned such that it forms an acute angle with respect to the first end of the first drain channel and forms an obtuse angle with respect to the second end of the first drain channel; and
    an air intake valve mounted to the first end of the first drain channel, the air intake valve being configured to allow exterior air to enter into the first drain channel through the first end, and prevent internal air from exiting the first drain channel through the first end.

2. The plumbing drain assembly of claim 1, wherein the second end of the first drain channel extends through the first sidewall of the plumbing outlet box.

3. The plumbing drain assembly of claim 1, wherein the centerline is perpendicular to the first sidewall and an opposite second sidewall, and is parallel to lateral third and fourth ones of the sidewalls.

4. The plumbing drain assembly of claim 1, wherein the plumbing outlet box further comprises one or more liquid inlets situated on the first sidewall or an opposite second sidewall.

5. The plumbing drain assembly of claim 4, wherein the one or more liquid inlets comprise two liquid inlets, located on opposite sides of the drain outlet on the first sidewall.

6. The plumbing drain assembly of claim 1, wherein the Y connector comprises a main body that includes the intersection of the first and second drain channels, and a pipe that is coaxial with the first drain channel and extends outward from the main body towards the second end of the first drain channel, the pipe including an angled end and an opposite mounted end that is mounted to the main body, the angled end of the pipe lying within a plane that is angled relative to the centerline at a non-perpendicular, non-parallel angle.

7. The plumbing drain assembly of claim 6, wherein the pipe is coaxial with the centerline.

8. The plumbing drain assembly of claim 6:
    wherein the second end of the first drain channel has a greater exterior diameter measured perpendicular to the centerline than an exterior diameter of the pipe measured perpendicular to the centerline, to form a ledge.

9. The plumbing drain assembly of claim 6, wherein the angled end of the pipe causes the pipe to have a length measured between the mounted and angled ends that is longer on a first side of the pipe than on an opposing second side of the pipe.

10. The plumbing drain assembly of claim 9, wherein the longer first side of the pipe and the second drain channel are positioned on the same side of the first drain channel.

11. The plumbing drain assembly of claim 9, wherein a ratio between the following is within the range of 0.65-0.8:
    a distance measured between a longest side of the pipe at the angled end of the pipe and the first end of the first drain channel, the distance being measured parallel to the centerline; and
    a distance between the first and second sidewalls.

12. The plumbing drain assembly of claim 9, a ratio between the following is within the range of 0.8-0.9:
    a distance measured between the first end of the first drain channel and the angled end of the pipe at the longest side of the pipe; and
    a distance measured between the first end of the first drain channel and the angled end of the pipe at the shortest side of the pipe;
    each distance being measured parallel to the centerline.

13. The plumbing drain assembly of claim 9, wherein the angle between the plane and another plane that is perpendicular to the centerline is about 10 degrees.

14. The plumbing drain assembly of claim 1, wherein the second drain channel comprises a first end which is externally threaded along an opening sized to receive a drain tube, and an opposite second end at which the second drain channel merges with the first drain channel, the plumbing drain assembly further comprising:
    a ring; and
    an internally threaded collar configured to:
        mount to the first end of the second drain channel by rotating its internal threading with respect to the external threading of the first end of the second drain channel; and
        compress the ring between the collar and the first end of the second drain channel through the rotating.

15. The plumbing drain assembly of claim 1, wherein the air intake valve is externally threaded, and the first end of the first drain channel is internally threaded for mounting the air intake valve to the first end of the Y connector.

16. A method of mounting a plumbing drain assembly into a plumbing outlet box, the plumbing drain assembly comprising a Y connector having a first drain channel and an angled second drain channel that merges with the first drain channel between first and second ends of the first drain channel, the plumbing outlet box having a back wall and four sidewalls that extend outward from the back wall to form a cavity having an open front, the method comprising:
    positioning the Y connector in relation to the plumbing outlet box such that the second end of the first drain channel is situated within the cavity, and the first end of the first drain channel is angled outward to extend outside the cavity through the open front;
    inserting the second end of the first drain channel into a drain outlet in a first one of the sidewalls of the plumbing outlet box while the first end of the first drain channel is still angled to extend outside the cavity through the open front; and
    pivoting the Y connector upwards into the cavity of the plumbing outlet box such that the first drain channel extends between the first sidewall and a second one of the sidewalls that is opposite the first sidewall, and is perpendicular to the first and second sidewalls.

17. The method of claim 16, further comprising:
mounting an air intake valve to the first end of the first drain channel, said mounting occurring before the positioning, inserting, and pivoting, thereby allowing exterior air to enter into the first drain channel through the first end, and preventing internal air from exiting the first drain channel through the first end.

18. The method of claim 17, wherein after said mounting, positioning, inserting, and pivoting, the second drain channel of the Y connector that merges with the first drain channel between the first and second ends of the first drain channel extends outside the cavity through the open front, and is exposed to provide access to the first drain channel.

19. The method of claim 16, wherein the second drain channel has a first end and an opposite second end that merges with the first drain channel between first and second ends of the first drain channel, the method further comprising positioning the Y connector within the cavity, with the first end of the second drain channel facing outward for receiving a drain tube.

20. The method of claim 19, further comprising:
mounting a collar to the first end of the second drain channel by rotating the collar, which is threaded for attachment to the first end of the second drain channel; and
compressing, via the rotating, a ring between the collar and the first end of the second drain channel.

21. The method of claim 16, wherein the Y connector comprises a main body that includes the intersection of the first and second drain channels, and a pipe that is coaxial with the first drain channel and extends outward from the main body towards the second end of the first drain channel, the method further comprising:
abutting, after said pivoting, a ledge of the Y connector against the first sidewall of the plumbing outlet box, the ledge being formed by a junction of a mounted end of the pipe and the main body at which the main body has a greater exterior diameter than the pipe;
wherein said inserting the second end of the first drain channel into the drain outlet comprises inserting an angled end of the pipe that is opposite from the mounted end of the pipe into the drain outlet.

* * * * *